(12) United States Patent
Schober et al.

(10) Patent No.: US 9,366,555 B2
(45) Date of Patent: Jun. 14, 2016

(54) AIR DATA SYSTEM

(71) Applicant: Lockheed Martin Corporation, Bethesda, MD (US)

(72) Inventors: Stephen J. Schober, Ithaca, NY (US); Brian M. Fuller, Binghamton, NY (US); Michael John Malia, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 292 days.

(21) Appl. No.: 14/132,436

(22) Filed: Dec. 18, 2013

(65) Prior Publication Data

US 2015/0177032 A1 Jun. 25, 2015

(51) Int. Cl.
| | |
|---|---|
| *G01P 5/165* | (2006.01) |
| *G01F 1/46* | (2006.01) |
| *B64D 45/00* | (2006.01) |
| *G01P 5/14* | (2006.01) |
| *G01P 5/16* | (2006.01) |

(52) U.S. Cl.
CPC ............ *G01F 1/46* (2013.01); *B64D 45/00* (2013.01); *G01P 5/14* (2013.01); *G01P 5/16* (2013.01)

(58) Field of Classification Search
CPC ............. G01C 23/00; G01F 1/46; G01F 1/40; G01F 25/0007; G01P 5/165; G01P 5/16; G01P 13/025
See application file for complete search history.

(56) References Cited

U.S. PATENT DOCUMENTS

| | | | | |
|---|---|---|---|---|
| 1,971,534 A | * | 8/1934 | Peace, Jr. ................ | G01P 5/165 219/201 |
| 2,042,700 A | * | 6/1936 | Colvin .................... | G01P 5/165 73/861.68 |
| 2,204,367 A | * | 6/1940 | Kollsman ................ | G01F 1/46 73/861.68 |
| 2,221,547 A | * | 11/1940 | Kollsman ................ | G01P 5/165 219/201 |
| 2,283,045 A | * | 5/1942 | Carbonara ............... | G01P 5/165 205/73 |
| 2,952,154 A | * | 9/1960 | Traksel .................... | G01P 5/16 73/178 H |
| 3,149,491 A | * | 9/1964 | Sissenwine ............. | G01P 5/00 73/178 R |
| 3,329,016 A | * | 7/1967 | Leavens ................... | G01P 5/16 73/178 H |

(Continued)

FOREIGN PATENT DOCUMENTS

| | | |
|---|---|---|
| DE | 102012209352 A1 | 12/2013 |
| EP | 1918686 A2 | 5/2008 |

(Continued)

OTHER PUBLICATIONS

PCT Search Report for International Pat. App. No. PCT/US2014/070581 filed on Dec. 16, 2014, mailed on Mar. 16, 2015. 5 pages.

(Continued)

*Primary Examiner* — David A Rogers
(74) *Attorney, Agent, or Firm* — Reising Ethington P.C.

(57) ABSTRACT

An air data system including a housing, a bore, a dynamic port, a static port, a gas permeable membrane, and a device configured to determine a pressure differential. The bore may be located within the housing and may extend from an inlet for receiving air flow to an outlet. The dynamic port may be located in the bore and be configured and positioned to receive air passing through the bore. The static port may be configured and positioned to receive unmoving or ambient air. The device may determine the pressure differential between dynamic air received at the dynamic port and static air received at the static port. And the membrane may span the dynamic port, the static port, or both and is configured to direct moisture away from the port which it spans.

17 Claims, 2 Drawing Sheets

(56) References Cited

U.S. PATENT DOCUMENTS

| | | | | |
|---|---|---|---|---|
| 3,349,615 | A * | 10/1967 | Finkl | G01P 5/16 73/182 |
| 3,365,928 | A * | 1/1968 | Andresen, Jr. | G01P 21/025 73/1.29 |
| 3,400,583 | A * | 9/1968 | Newport | G01P 5/165 73/182 |
| 3,719,082 | A * | 3/1973 | Obermaier | G01F 1/46 73/202 |
| 3,739,638 | A * | 6/1973 | White | G01P 5/01 73/181 |
| 4,384,469 | A * | 5/1983 | Murphy | G01F 25/0007 73/1.29 |
| 4,920,808 | A | 5/1990 | Sommer | |
| 5,060,655 | A * | 10/1991 | Rudolph | G01F 1/40 600/529 |
| 5,134,890 | A * | 8/1992 | Abrams | A61B 5/087 600/538 |
| 6,672,152 | B2 * | 1/2004 | Rouse | G01P 13/025 73/170.01 |
| 7,124,630 | B2 * | 10/2006 | Hanson | B64D 15/12 374/E13.006 |
| 7,284,448 | B2 * | 10/2007 | Klammler | G01F 1/40 73/861.04 |
| 7,716,980 | B1 * | 5/2010 | Colten | G01P 5/165 73/170.02 |
| 7,828,477 | B2 * | 11/2010 | Benning | G01K 13/02 374/109 |
| 8,113,046 | B2 | 2/2012 | Speldrich et al. | |
| 8,392,141 | B2 * | 3/2013 | Wigen | G01K 7/42 702/99 |
| 8,857,255 | B2 * | 10/2014 | Anderson | G01P 5/165 73/170.02 |
| 9,080,903 | B2 * | 7/2015 | Ashton | G01P 5/165 |
| 2003/0051546 | A1 * | 3/2003 | Collot | G01K 13/02 73/170.02 |
| 2006/0101923 | A1 * | 5/2006 | Hager | G01F 1/692 73/861.63 |

FOREIGN PATENT DOCUMENTS

| | | | | |
|---|---|---|---|---|
| GB | 191327931 | A * | 0/1914 | G01P 5/165 |
| GB | 530722 | A * | 12/1940 | G01P 5/165 |
| GB | 2446827 | A * | 8/2008 | G01F 1/46 |
| RU | 2046344 | C1 * | 10/1995 | |
| SU | 800648 | A1 * | 1/1981 | |
| WO | 2013028220 | A1 | 2/2013 | |

OTHER PUBLICATIONS

The Smithsonian National Air and Space Museum's website. Object Collections page regarding the Pitot-Venturi Tube for airspeed measurement of aircraft, circa 1917; 1 page.

* cited by examiner

AIR DATA SYSTEM

BACKGROUND

1. Field

This application relates generally to a device for determining a differential between dynamic fluid pressure and static fluid pressure in an air data system.

2. Description or Related Art Including Information Disclosed Under 37 CFR 1.97 and 1.98

Pitot-static systems have commonly been used to measure air speed of aircraft. Such systems commonly have a ram air source such as a pitot tube and a static source such as a static port, both coupled to instrumentation. In use on an aircraft, pitot tubes are subject to capturing moisture and debris, which can ultimately lead to inaccurate readings in the instrumentation and even catastrophic failures at her altitudes where temperatures may cause freezing. While heaters have been implemented to alleviate freezing, moisture and debris may still accumulate in the pitot tube or the static opening, providing incorrect data to the aircraft.

SUMMARY

An air data system including a housing, a bore, a dynamic port, a static port, a gas permeable membrane, and a device configured to determine a pressure differential. The bore may be located within the housing and may extend from an inlet for receiving air flow to an outlet. The dynamic port may be located in the bore and be configured and positioned to receive air passing through the bore. The static port may be configured and positioned to receive unmoving or ambient air. The device may determine the pressure differential between dynamic air received at the dynamic port and static air received at the static port. And the membrane may span the dynamic port, the static port, or both and is configured to direct moisture away from the port which it spans.

In another embodiment, a method is provided of determining a pressure differential. The method includes the steps of receiving air at a dynamic port having a first pressure; receiving air at a static port having a second pressure; diverting moisture from the dynamic port, the static port, or both; and determining a pressure differential associated with the air received at the dynamic port and the static port.

DRAWING DESCRIPTIONS

DETAILED DESCRIPTION

Figure 1:
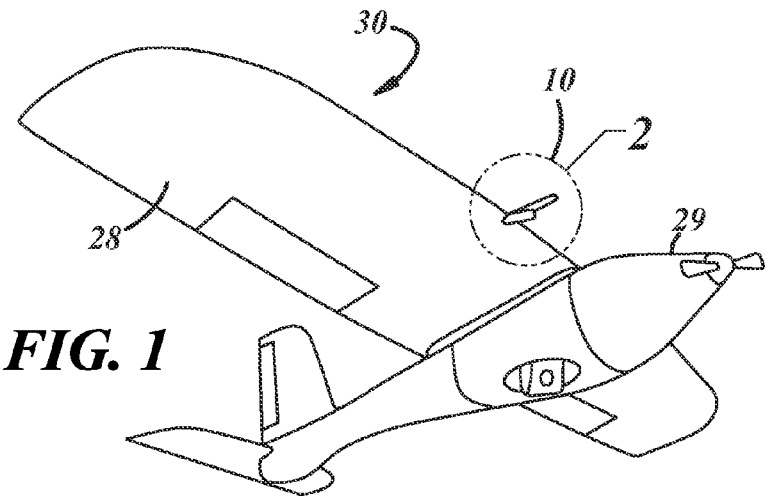
FIG. 1 is a perspective view of an exemplary environment of the disclosure, illustrating an unmanned aerial vehicle (UAV) having an air data system.

An air data system 10 for determining a pressure differential is shown generally in FIGS. 1-6. The system may include a housing 12, a bore 14 located within the housing and extending from an inlet 16 for receiving air flow to an outlet 18, a dynamic port 20 opening into the bore 14 and configured and positioned to receive air passing through the bore, a static port 22 configured and positioned to receive static air, a gas permeable membrane 24 spanning the dynamic port or static port or both, and a device 26 configured to determine a pressure differential between dynamic air received at the dynamic port 20 and static air received at the static port 22. The membrane 24 may be configured to direct moisture away from the port(s) 20, 22 that it spans. The air data system 10 may receive dynamic air from ram air flow passing from the inlet 16 to the outlet 18. Dynamic air may be received via the dynamic port 20 at a first pressure. And static air may be received via the static port 22 at a second pressure. And the device 26 may provide air data based on the pressure differential between the first and second pressures. The air data system 10 may be employed on and carried by an unmanned aerial vehicle (UAV) 30 as illustrated in FIG. 1 and as will be described in greater detail below.

The UAV 30 of FIG. 1 is merely one exemplary environment of the air data system 10 for determining a fluid pressure differential. In some implementations, at least the housing 12 of the system 10 may be fixed relative to ground while the fluid moves relative to the housing. In other embodiments, such as in FIG. 1, the housing 12 may be carried by a moving body or vehicle. Here, the housing 12 is coupled to the wing 28 of the UAV 30; however, it may be coupled elsewhere as well (e.g., a fuselage or body 29, tail, etc.). In all instances, the UAV is only an example of a vehicle; other implementations using the air data system 10 are described and will be apparent to those of ordinary skill in the art.

Figure 2:
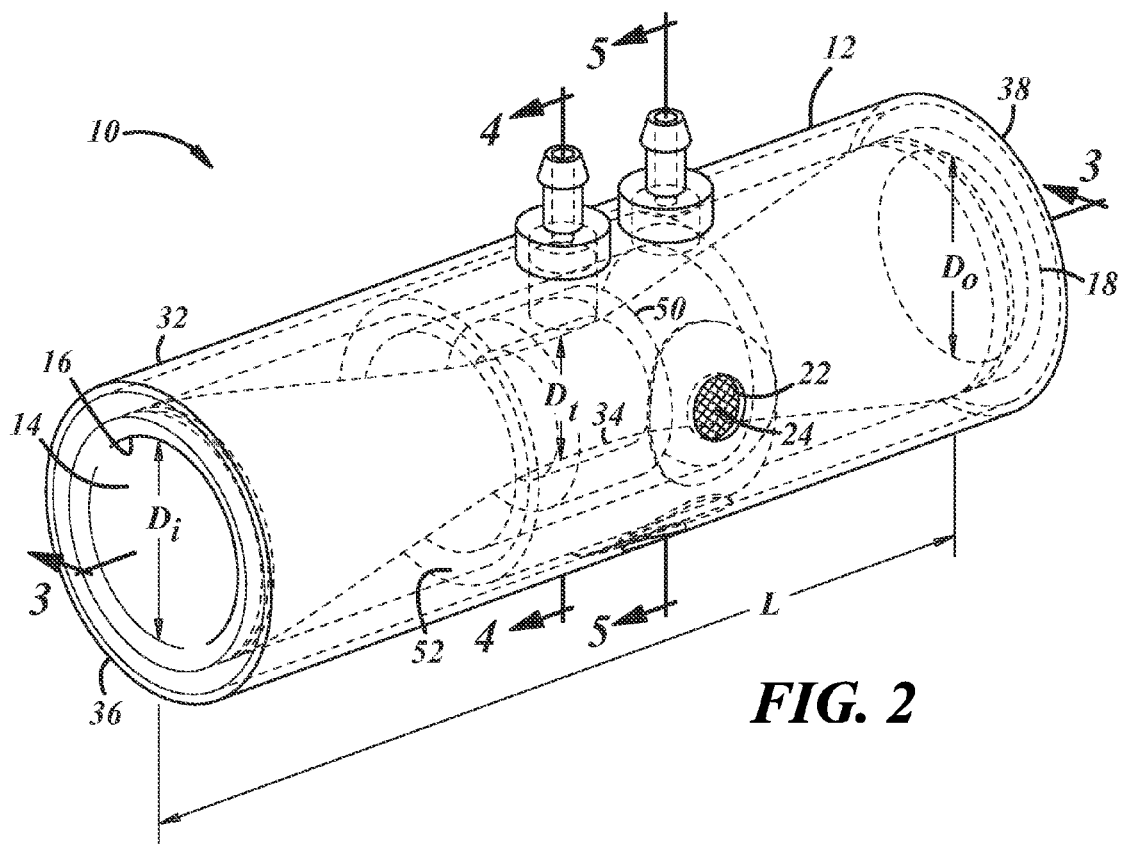
FIG. 2 is an orthogonal view of a housing of the air data system shown in FIG. 1.

In FIG. 2, the housing or body 12 of the air data system is shown having a generally cylindrical exterior surface 32 surrounding the longitudinally extending bore 14. The bore may have a throat region or constricted region 34 between the inlet 16 at a first end 36 and the outlet 18 at a second end 38. An upstream region 40 may axially extend from the first end 36 towards the throat region 34 and a downstream region 42 may axially extend from the throat region 34 towards the second end 38. In the illustrated implementation, the bore 14 may be generally hour-glassed shaped such that the throat region 34 has the narrowest cross-section. The dimensions of the housing 12 may vary; however, in some implementations, the diameter ($D_i$) of the inlet 16 or the diameter ($D_o$) of the outlet 18 may be between 0.4 inches and 2 inches, the cross-sectional diameter ($D_t$) of the throat region 34 may be 50% less than the inlet 16 or outlet 18, and the axial length (L) of the housing 12 may be approximately 2 inches. In at least one implementation, the dimensions may be: $D_i=D_o=0.4$ inches, $D_t=0.2$ inches, and L=2 inches. But it should be appreciated that in some embodiments, $D_i$ and $D_o$ may differ.

An interior surface 44 of the bore may be generally smooth. The interior surface 44 in the upstream region 40, the downstream region 42, or both may comprise a hydrophilic material. And the interior surface 44 in the throat region 34 may comprise a hydrophobic material. In some implementations, the bore 14 may comprise hydrophilic and/or hydrophobic materials. And in other implementations, the interior surface 44 of the bore 14 may be coated. Thus, the bore 14 may be coated with and/or composed of hydrophilic materials; examples include Aculon™ Hydrophilic coatings, Lotus Leaf™ HydroPhil™, and Biocoat™ Hydak™. Or the bore 14 may be coated with and/or composed of hydrophobic materials; examples include Aculon™ Superhydrophobic coatings, Rust-Oleum™ NeverWet™, Lotus Leaf™ Hydro-Foe™, Ultra Ever-Dry™ coating, or Insurftec™ Liquipel™. It should be appreciated that the interior surface 44 is smooth in one embodiment; however, in other embodiments, the bore 14 may not be smooth (e.g., it may have longitudinally extending ridges or rifling, etc.).

Figure 3:
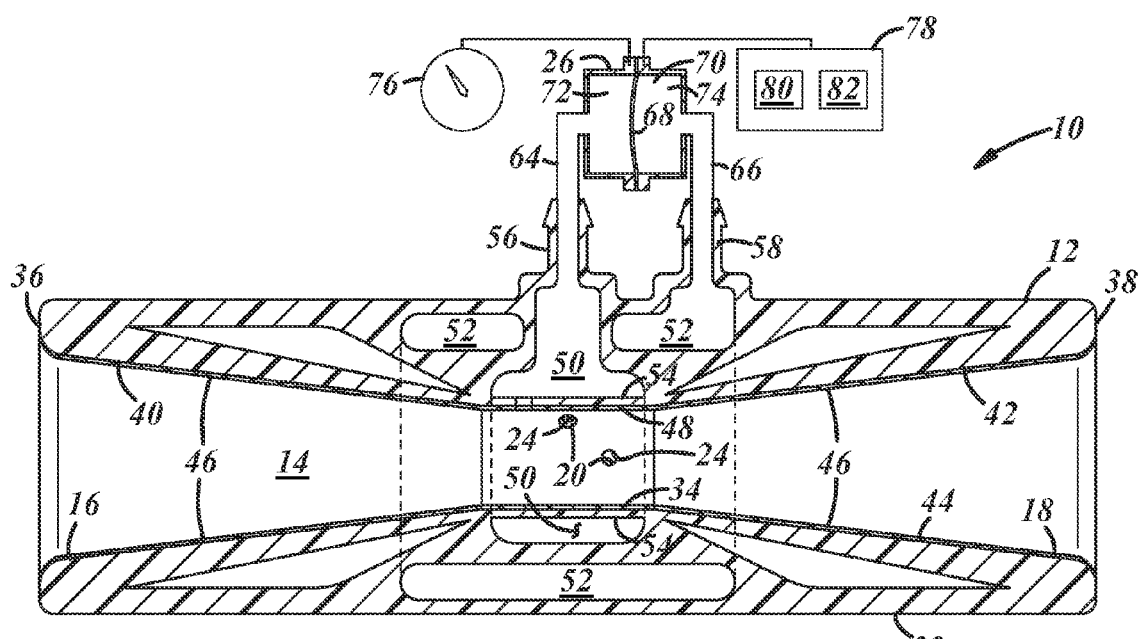
FIG. 3 is a cross-sectional view of the housing shown in FIG. 2 along section lines 3-3 of FIG. 2 and including a partial schematic view of the air data system.
Figure 4:
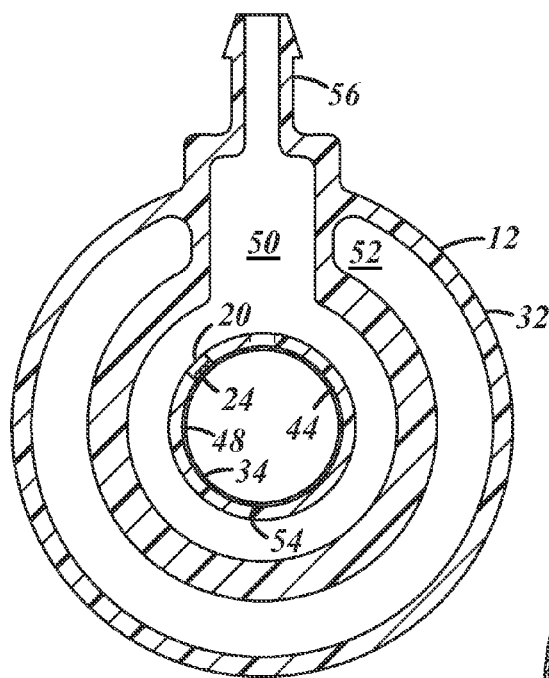
FIG. 4 is a cross-sectional view of the housing shown in FIG. 2 along section lines 4-4 of FIG. 2.
Figure 5:
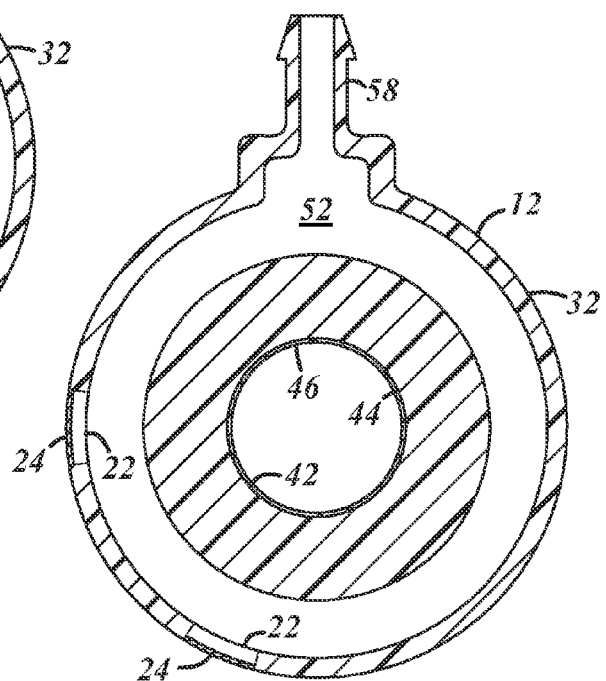
FIG. 5 is a cross-sectional view of the housing shown in FIG. 2 along section lines 5-5 of FIG. 2.

Spaced between the exterior surface 32 and the bore 14, the housing 12 may have a dynamic air chamber 50 and a static air chamber 52 (see FIGS. 2-5). In at least one embodiment, the volume of the air chambers 50, 52 may at least partially circumferentially extend around the bore 14. In FIGS. 2 and 3, the dynamic air chamber 50 is shown axially located in the throat region 34 of the bore 14 but being separated from the bore by a throat wall 54. The dynamic air chamber 50 extends at least partially circumferentially around the throat region 34 and extends radially outwardly from the throat wall 54. A first nozzle 56 is shown at the exterior surface 32 of the housing 12 in fluid communication with the dynamic air chamber 50 (see also FIG. 4). The static air chamber 52 is shown radially outwardly of the dynamic air chamber 50 being axially located in the throat region 34 but also axially extending around part of the upstream and downstream regions 40, 42. The static air chamber 52 extends radially outwardly towards the exterior surface 32 and extends at least partially circumferentially around the bore and dynamic air chamber 50. A second nozzle 58 is shown at the exterior surface 32 of the housing in fluid communication with the static air chamber 52 (see also FIG. 5).

The dynamic air chamber 50 may be in fluid communication with one or more dynamic ports or openings 20 located the throat region 34 of the bore, more specifically in the throat wall 54. The static air chamber 52 may be in communication with one or more static ports or openings 22 located at the exterior surface 32 of the housing. The size and shape of the dynamic and static port(s) 20, 22 may vary. In some implementations, the port(s) 20, 22 are circular. For example, the dynamic port(s) 20 may have a diameter between 0.03 inches and 0.5 inches, and the static port(s) 22 may have a diameter between 0.03 inches and 0.5 inches. In the implementation shown in FIGS. 2 and 3, the diameter of the dynamic port(s) 20 is approximately 0.125 inches and the diameter of the static port(s) 22 is approximately 0.125 inches.

The dynamic port(s) 20, the static port(s) 22, or both may or may not have gas permeable membranes 24 that may fully span the port 20, 22. The gas permeable membrane 24 should be construed broadly to include any porous material capable of inhibiting or obstructing the penetration of solids and liquids but generally allowing the penetration of gases. The membranes 24 may be low pressure membranes (i.e., being water-resistant at instantaneous pressures up to 8 milli-bars (mbar)) or high pressure membranes (i.e., being water-resistant at instantaneous pressures up to 1.7 bar). Suitable materials include protective or acoustic vents comprising e-PTFE or expanded polytetrafluoroethylene or cellulose/PET-nonwoven (i.e., polyethylene terephthalate nonwoven) commercially available via Gore-Tex™.

The first and second nozzles 56, 58 may be in fluid communication with the device 26 for determining a pressure differential. As shown in the FIG. 3, the first nozzle 56 is in communication with the device 26 via a first passage 64. Similarly, the second nozzle 58 is in communication with the device 26 via a second passage 66. The device 26 may include a pressure responsive device or sensor 68 such as a diaphragm and a device chamber 70 sealably divided into a first cavity 72 and a second cavity 74 by the diaphragm—the first passage 64 opening into the first cavity 72 and the second passage 66 opening into the second cavity 74. The sensor 68 may mechanical, electrical, or electro-mechanic nature. The device 26 may be coupled to various suitable meters 76 (e.g., an air speed indicator) or to a computer 78 which may electronically convey data to various suitable instrumentation (such as a digital air speed indicator (not shown)).

The computer 78 shown in FIG. 3 includes a processor 80 and memory 82. The processor 80 can be any type of device capable of processing electronic instructions including microprocessors, microcontrollers, host processors, controllers, vehicle communication processors, and application specific integrated circuits (ASICs). It can be a dedicated processor used only for device 26 or can be shared with other systems (e.g., on the UAV). The processor 80 executes various types of digitally-stored instructions, such as software or firmware programs stored in memory 82, which enable the device 26 to determine the pressure differential. For instance, the processor 80 can execute programs or process data to carry out at least a part of the method discussed below.

The described air data system 10 may be used to determine a pressure differential in a variety of suitable applications. For purposes of illustration, one or more methods will be described with respect to the exemplary environment shown in FIG. 1. Initially, the housing 12 may be coupled to fuselage 29, tail, wing 28, etc. of the UAV 30 and be oriented to receive relative wind at the inlet 16. This orients the bore 14 to receive ram air; it also orients the direction of the received ram air to be transverse to dynamic port(s) 20 in the bore and the direction of the relative wind at the exterior surface 32 of the housing 12 to be transverse to the static port(s) 22. Thus in FIG. 1, the housing 12 is shown generally longitudinally parallel with the fuselage 29 of the UAV 30.

The UAV 30 may take flight receiving ram air at the inlet 16, the ram air passing through the bore 14, and out of the outlet 18. Ram air is any air moving into the bore 14 including air caused by actual wind, relative wind, or both. As will be appreciated by artisans of ordinary skill, as the ram air moves from the upstream region 40 through the throat region 34, the air speed increases as the cross-sectional area $\{\pi^*(D_t/2)^2\}$ decreases; i.e., the Venturi effect. The ram air may move transversely over the dynamic port(s) 20. Thus, the pressure of the ram air at the dynamic port(s) 20 and the associated membrane(s) 24 may be the same as or relative to the pressure in the dynamic air chamber 50, in the first passage 64, and in the first cavity 72 of the device 26. Thus, the air pressure at the dynamic port(s) 20 may be relative to the pressure exerted on the diaphragm 68 from the first cavity 72; e.g., this pressure may be determinable based on the properties of the gas permeable membrane 24.

And finally, the ram air may move beyond the throat region 34 and the dynamic port(s) 20 and continuing into the downstream region 42 eventually exiting the housing 12 at the outlet 18.

While ram air is being received into the bore 14, air also may move transversely over the exterior surface 32 of the housing 12 and over the static port(s) 22. The ambient air pressure at the static port(s) 22 and the associated membrane(s) 24 may be the same as or relative to the pressure in the static air chamber 52, in the second passage 66, and in the second cavity 71 of the device 26. Thus, the air pressure at the static port(s) 22 may be relative to the pressure exerted on the diaphragm 68 in the second cavity 74; e.g., this pressure may be determinable based on the properties of the gas permeable membrane 24.

The diaphragm 68 may be calibrated to be responsive to the exerted and opposing pressures of the first and second cavities 72, 74. In one implementation, a mechanical meter 76 or other conventional device such as an air speed indicator is actuated by the diaphragm 68. In other implementations, the diaphragm 68 is configured to provide an electronic output (e.g., a piezo-electronic device). Thus, the diaphragm 68 may provide an electronic output to the processor 80 configured to determine and output suitable air data. This air data may be at least partially based on a determination of the difference in pressure at the dynamic and static ports (or the dynamic and static chambers, etc.); i.e., it may not be necessary to acquire the actual pressure values to make the determination. Thus, as used herein, the term dynamic should be construed broadly and not limited, e.g., to Bernoulli's "dynamic" pressure. This air data may include data associated with air speed, vertical speed, altitude, etc.

When the UAV 30 is flown through air having moisture and debris (e.g., rain, sleet, snow, fog, dust, sand, etc.), the moisture and debris may pass through the bore 14 and be diverted from the dynamic and static port(s) 20, 22. Within the bore 14, the hydrophilic surfaces in the upstream and downstream regions 40, 42 may attract moisture and the hydrophobic surface within the throat region 34 may repel moisture. Thus, moisture may be diverted from the dynamic port(s) 20 in the throat region 34. The gas permeable membrane(s) 24 over the dynamic and static port(s) 20, 22 may also divert moisture by preventing penetration, and in some instances, the membrane 24 itself may be composed of a hydrophobic material. In addition, since the ram air speed increases as it passes through the throat region 34, some moisture and debris may be forced out of the throat region 34 and diverted away from the dynamic port(s) 20. Lastly, since both the dynamic and static port(s) 20, 22 are oriented perpendicularly to the overflowing air, the opportunity for moisture and debris to become captured or lodged in or around the ports 20, 22 is minimized. By diverting moisture from the dynamic and static port(s) 20, 22, the opportunity for freezing and clogging of the ports 20, 22 also is minimized.

The moisture may be diverted even when the UAV 30 is submerged in liquid. For example, if the UAV makes a water-landing filling or submerging the bore 14, upon take-off or resumption of flight, the water may self-drain or exit the bore 14. Further, the hydrophobic membranes 24 of the air data system 10 may resist the ingress of liquid in up to 3 meters of liquid.

Other implementations of the air data system 10 include an air data system having the first and second passages 64, 66, the device 26, and the computer 78 carried by the housing 12.

In another implementation, the static air data port(s) 22 may be located in the bore 14; more specifically, in the upstream or downstream regions 40, 42.

In another implementation, there may be multiple devices 26 each being paired with one dynamic port 20 and one static port 22. Each dynamic port 20 may be in communication with a single dynamic air chamber 50, and each static port 22 may be in communication with a single static air chamber 52. For example, the illustrated dynamic air and static air chambers 50, 52 may be segregated into compartments. In this implementation, the computer processor 80 may receive electronic input data from each of the devices 26 and may average or otherwise use the input data to provide an air data output (e.g., to make a determination of air speed, etc.). In addition, the processor 80 may be configured to exclude or omit input data from one or more of the devices 26 when making the determination; e.g., when the particular input data is anomalous or above or below a predetermined threshold or average. For example, input data from one device 26 may be excluded as anomalous when it is above or below one or more other inputs by a predetermined value; for example the processor may exclude data gathered by the particular device 26 assuming that its port(s) have been clogged or obstructed. In embodiments utilizing multiple dynamic and static ports 20, 22, the air data system 10 has redundancies, e.g., for mission critical instruments such as the air speed indicator.

In another implementation, the throat region 34 may not be part of the bore 14; i.e., the bore 14 may not be constricted. For example, the bore 14 may be a cylinder.

Of course, numerous variations are possible; e.g., there can be two or more ports 20, 22 for each dynamic air or static air chamber 50, 52. Also, the dynamic air chambers 50 may be segregated but the static air chamber 50 is not (or vice-versa), etc. Other implementations will be apparent to those of ordinary skill in the art.

The method(s) may be performed as one or more computer programs executable by one or more computing devices 78 to cause the air data system 10 to perform the method, and the various method related data may be stored in any suitable memory 82. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the methods may be at least partially performed by any electronic device(s) capable of executing the above-described functions.

Thus, there has been disclosed both the air data system 10 and a method of using the air data system to determine a pressure differential. The air data system 10 may be fixed relative to earth or used on a moving object such as the described UAV 30. When ram air is received into the bore 14, the pressure differential may be determined using the dynamic air received at one or more dynamic ports 20 and static air received at one or more static ports 22. This determination may be performed by the device 26 such as the diaphragm 68 and may or may not include the use of a computer 78 or processor 80. Obstructions to the ports 20, 22 are less likely due to their position and orientation. Furthermore, the moisture is diverted from the dynamic air and/or static ports 20, 22 by a variety of features including the gas permeable membranes 24, the throat region 34 of the bore 14, and the strategically located hydrophilic and hydrophobic surfaces in the upstream and downstream regions 40, 42 of the bore.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An air data system, comprising:
   a housing;
   a bore located within the housing and extending from an inlet for receiving air flow to an outlet;
   a dynamic port located in the bore and configured and positioned to receive air passing through the bore;
   a static port configured and positioned to receive static air;
   a device configured to determine a pressure differential between dynamic air received at the dynamic port and static air received at the static port; and a gas permeable membrane spanning at least one of the dynamic port or the static port and configured to direct moisture away from the at least one port it spans.

2. The air data system of claim 1 in which the gas permeable membrane is a polytetrafluoroethylene material.

3. The air data system of claim 1 further comprising a throat region in the bore between the inlet and the outlet, the dynamic port being located in the throat region.

4. The air data system of claim 3 in which the throat region has a hydrophobic surface.

5. The air data system of claim 1 in which the bore further comprises an upstream region between the inlet and the throat region and a downstream region between the throat region and the outlet, in which at least one of the regions has a hydrophilic surface.

6. The air data system of claim 1 in which the static port is located at an exterior surface of the housing.

7. The air data system of claim 1 in which the device further comprises a device chamber sealably divided by a diaphragm into a first cavity and a second cavity, the first cavity in fluid communication with the dynamic port and second cavity in fluid communication with the static port.

8. The air data system of claim 1 further comprising a processor configured to execute instructions to determine a pressure differential based on an electronic input received from the device.

9. The air data system of claim 1 further comprising a plurality of dynamic ports located in the bore.

10. The air data system of claim 9 further comprising a plurality of static ports.

11. The air data system of claim 10 in which the device is configured to determine a pressure differential between air pressure received by at least one port of the plurality of dynamic ports and at least one port of the plurality of static ports.

12. The air data system of claim 11 in which, in its determination, the device is configured to ignore the received air pressure of at least one of the ports when the air pressure of the at least one port is anomalous.

13. An unmanned aerial vehicle (UAV), comprising a fuselage and a wing adapted for flight, in which the wing carries the air data system defined in claim 1.

14. A method of determining a pressure differential, comprising the steps of:
    (a) receiving air at a dynamic port located in an interior surface of a bore, and in which at least part of the interior surface is a hydrophobic or hydrophilic surface, the dynamic port having a first pressure;
    (b) receiving air at a static port having a second pressure;
    (c) diverting moisture from at least the dynamic port or the static port; and
    (d) determining a pressure differential associated with the air received at the dynamic port and the static port.

15. The method of claim 14 in which step (c) includes providing a gas permeable membrane in a position spanning at least one of the dynamic port or the static port.

16. The method of claim 14 in which step (a) includes receiving air at a dynamic port disposed in a throat region of the interior surface between an upstream region and a downstream region, the upstream and downstream regions having hydrophobic surfaces and the throat region having a hydrophilic surface.

17. The method of claim 14 in which step (a) includes receiving air at a plurality of dynamic ports and step (b) includes receiving air at a plurality of static ports, and the determination of step (d) is based on the air received by at least one of the dynamic ports and at least one of the static ports.

* * * * *